(12) United States Patent
Nada

(10) Patent No.: US 8,075,148 B2
(45) Date of Patent: Dec. 13, 2011

(54) ILLUMINATION APPARATUS, COLOR CONVERSION DEVICE, AND DISPLAY APPARATUS

(75) Inventor: Naoji Nada, Kanagawa (JP)

(73) Assignee: Sony Corporation, Tokyo (JP)

( * ) Notice: Subject to any disclaimer, the term of this patent is extended or adjusted under 35 U.S.C. 154(b) by 263 days.

(21) Appl. No.: 12/328,272

(22) Filed: Dec. 4, 2008

(65) Prior Publication Data

US 2009/0147497 A1   Jun. 11, 2009

(30) Foreign Application Priority Data

Dec. 7, 2007 (JP) ................................. 2007-317455

(51) Int. Cl.
*F21V 9/16* (2006.01)
(52) U.S. Cl. ........................... 362/84; 362/293; 362/97.1
(58) Field of Classification Search .................... 362/84,
362/97.1–97.4, 293; 349/106
See application file for complete search history.

(56) References Cited

U.S. PATENT DOCUMENTS

| | | | |
|---|---|---|---|
| 4,822,144 A | | 4/1989 | Vriens |
| 4,882,617 A | * | 11/1989 | Vriens ........................... 348/779 |
| 2004/0145913 A1 | * | 7/2004 | Ouderkirk et al. ............. 362/555 |
| 2005/0253158 A1 | * | 11/2005 | Yasukawa et al. ............... 257/98 |
| 2006/0002101 A1 | * | 1/2006 | Wheatley et al. ................ 362/84 |
| 2006/0002124 A1 | * | 1/2006 | Nguyen ......................... 362/507 |
| 2006/0066939 A1 | * | 3/2006 | Kimura .......................... 359/321 |
| 2007/0064442 A1 | * | 3/2007 | Yoo ................................ 362/612 |
| 2007/0104861 A1 | * | 5/2007 | Chen ................................ 427/66 |
| 2007/0230211 A1 | * | 10/2007 | Osato et al. .................... 362/600 |
| 2007/0240346 A1 | * | 10/2007 | Li et al. ............................ 40/544 |
| 2008/0043489 A1 | * | 2/2008 | Etori .............................. 362/618 |

FOREIGN PATENT DOCUMENTS

| | | | |
|---|---|---|---|
| EP | 0272760 A1 | | 6/1988 |
| JP | 3116727 | | 6/2000 |
| JP | 2002-062530 | | 2/2002 |
| JP | 2004127988 A | * | 4/2004 |
| JP | 2004-325874 | | 11/2004 |
| JP | 2004-234134 | | 9/2005 |
| JP | 2007-200877 | | 8/2007 |
| JP | 2007-241073 | | 9/2007 |
| JP | 2008-028128 | | 2/2008 |

OTHER PUBLICATIONS

European Patent Office, Communication enclosing the European Search Report for EP 08020642.8, dated Sep. 9, 2009.
Japanese Patent Office Action corresponding to Japanese Serial No. 2007-317455 dated Dec. 8, 2009.

* cited by examiner

*Primary Examiner* — Evan Dzierzynski
(74) *Attorney, Agent, or Firm* — SNR Denton US LLP

(57) ABSTRACT

An illumination apparatus includes a transparent substrate, a phosphor layer, an optical wavelength selection filter layer, and a light-emitting device. The transparent substrate includes a first surface and a second surface opposing each other. The phosphor layer is disposed on the first surface side of the transparent substrate. The optical wavelength selection filter layer is disposed on the second surface side of the transparent substrate and configured to transmit light of a first wavelength therethrough and reflect light of a second wavelength that is emitted from the phosphor layer by being excited by the light of the first wavelength. The light-emitting device is configured to emit the light of the first wavelength from the optical wavelength selection filter layer side thereof toward the optical wavelength selection filter layer.

13 Claims, 13 Drawing Sheets

FIG.1A
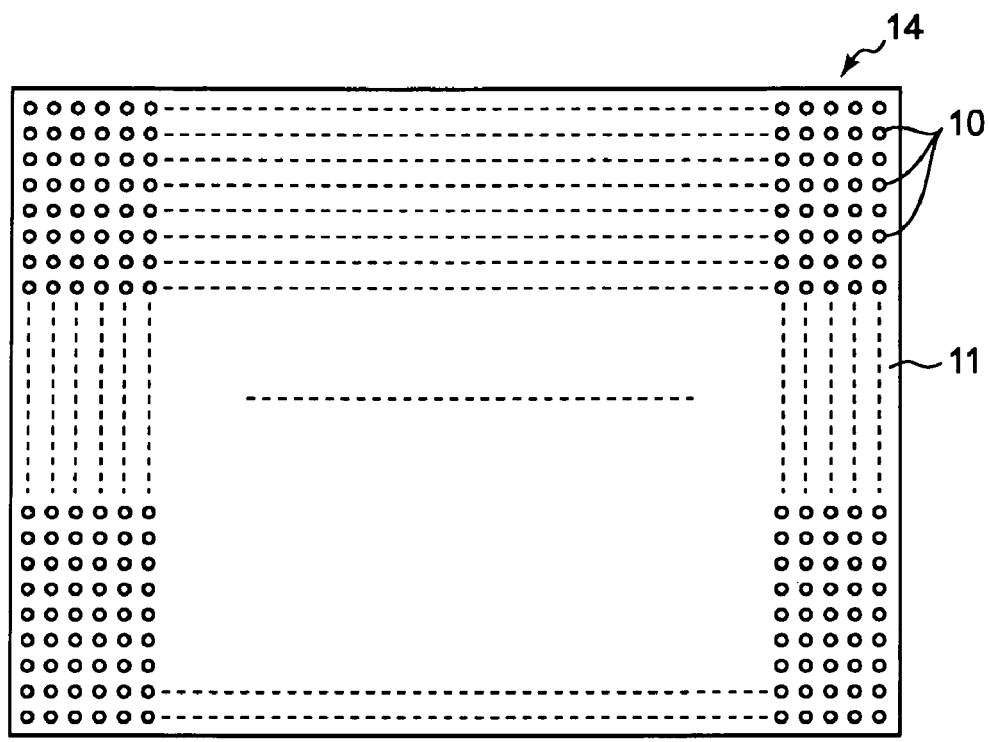
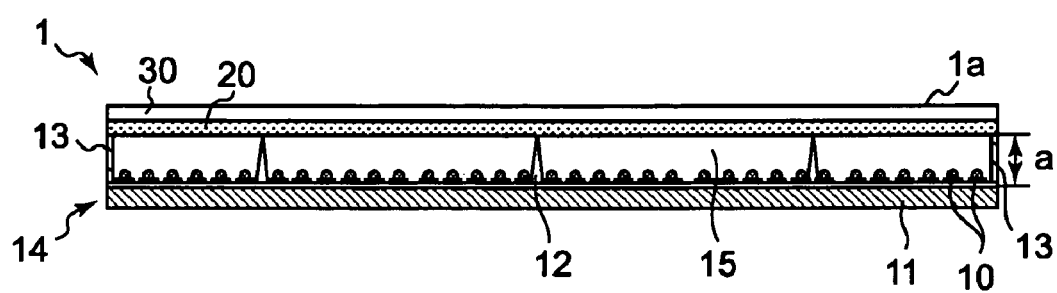
FIG.1B

ILLUMINATION APPARATUS, COLOR CONVERSION DEVICE, AND DISPLAY APPARATUS

CROSS REFERENCES TO RELATED APPLICATIONS

The present invention contains subject matter related to Japanese Patent Application JP 2007-317455 filed in the Japanese Patent Office on Dec. 7, 2007, the entire contents of which being incorporated herein by reference.

BACKGROUND OF THE INVENTION

1. Field of the Invention

The present invention relates to an illumination apparatus used in, for example, a display apparatus such as a liquid crystal display, a color conversion device used in the illumination apparatus, and a display apparatus that uses the illumination apparatus.

2. Description of the Related Art

As a light source of illumination apparatuses used in display apparatuses such as a liquid crystal display, EL and a cold cathode tube (CCFL (cold cathode fluorescent lamp)), for example, are used, and emission colors of those illumination apparatuses are mostly white.

Meanwhile, light-emitting diodes are now starting to be used as the light sources for illumination apparatuses. For example, as the illumination apparatus that uses the light-emitting diode as the light source, there is an illumination apparatus that uses a blue-light-emitting diode as the light source and is provided with a scattering layer on one surface of a light guide plate and a phosphor layer constituted of a phosphor on the other surface of the light guide plate (see, for example, Japanese Patent No. 3116727 (paragraphs [0006] to [0018], FIG. 2)). In this illumination apparatus, light emitted from the blue-light-emitting diode is scattered inside the light guide plate by the scattering layer so as to make surface luminance of the light guide plate uniform, and an emission color of light from the blue-light-emitting diode is combined with that of light from the phosphor, thus obtaining a white light emission.

SUMMARY OF THE INVENTION

In the illumination apparatus described above, light whose color has been converted by the phosphor layer among the light emitted from the light guide plate is emitted in various directions. Therefore, there has been a problem that there also is a significant amount of light that returns in a direction of the light guide plate, thus leading to a poor light use efficiency.

In view of the circumstance as described above, there is a need for an illumination apparatus with less loss of light emitted from a light-emitting device and with improved luminance, a color conversion device used in the illumination apparatus, and a display apparatus that uses the illumination apparatus.

According to an embodiment of the present invention, there is provided an illumination apparatus including a transparent substrate, a phosphor layer, an optical wavelength selection filter layer, and a light-emitting device. The transparent substrate includes a first surface and a second surface opposing each other. The phosphor layer is disposed on the first surface side of the transparent substrate. The optical wavelength selection filter layer is disposed on the second surface side of the transparent substrate and configured to transmit light of a first wavelength therethrough and reflect light of a second wavelength that is emitted from the phosphor layer by being excited by the light of the first wavelength. The light-emitting device is configured to emit the light of the first wavelength from the optical wavelength selection filter layer side thereof toward the optical wavelength selection filter layer.

In the embodiment of the present invention, because the optical wavelength selection filter layer is provided, excitation light from the light-emitting device can be introduced into the phosphor layer with a low loss, and light that is not emitted from an emitting surface of the illumination apparatus among the light whose color has been converted by the phosphor layer is reflected by the optical wavelength selection filter layer so as to be reused. Thus, an illumination apparatus with a high light efficiency and improved luminance can be obtained.

Further, in the illumination apparatus according to the embodiment of the present invention, the light-emitting device is a blue-light-emitting diode, and the phosphor layer includes a phosphor that emits green light by being excited by excitation light that is blue light and a phosphor that emits red light by being excited by the excitation light.

Accordingly, an illumination apparatus that emits white light can be obtained.

Further, in the illumination apparatus according to the embodiment of the present invention, the light-emitting device is a blue-light-emitting diode, and the phosphor layer includes a phosphor that emits yellow light by being excited by excitation light that is blue light.

Accordingly, an illumination apparatus that emits white light can be obtained.

Further, in the illumination apparatus according to the embodiment of the present invention, the light-emitting device is a purple (near ultraviolet)-light-emitting diode, and the phosphor layer includes a phosphor that emits red light by being excited by excitation light that is purple (near ultraviolet) light, a phosphor that emits green light by being excited by the excitation light, and a phosphor that emits blue light by being excited by the excitation light.

Accordingly, an illumination apparatus that emits white light can be obtained.

Further, in the illumination apparatus according to the embodiment of the present invention, the optical wavelength selection filter layer is constituted of a lamination layer obtained by laminating a plurality of films having different refractive indices.

By thus laminating the plurality of films having difference refractive indices, a film that transmits the light of the first wavelength therethrough and reflects the light of the second wavelength can be obtained.

Further, in the illumination apparatus according to the embodiment of the present invention, the lamination layer constituting the optical wavelength selection filter layer is obtained by laminating an $Nb_2O_5$ film and an $SiO_2$ film.

The $Nb_2O_5$ film and the $SiO_2$ film can thus be used as the plurality of films having different refractive indices.

Further, in the illumination apparatus according to the embodiment of the present invention, the light-emitting device is provided plurally in correspondence with an entire surface of the transparent substrate.

The plurality of light-emitting devices can thus be disposed on the entire surface.

Further, the illumination apparatus according to the embodiment of the present invention further includes a light guide plate disposed on an optical path of the light emitted from the light-emitting device, between the light-emitting device and the optical wavelength selection filter layer.

The light guide plate can thus be provided.

Further, in the illumination apparatus according to the embodiment of the present invention, the light-emitting device is provided plurally along an end portion of the light guide plate.

By using the light guide plate and disposing the light-emitting devices along the end portion thereof, it becomes possible to reduce the number of light-emitting devices as compared to the case where the light-emitting devices are disposed on the entire surface.

Further, the illumination apparatus according to the embodiment of the present invention further includes a protection film that has a moisture barrier function, the protection film disposed on a surface of the phosphor layer opposed to a surface thereof on the first surface side of the transparent substrate.

Because the protection film having the moisture barrier function is thus provided, degradation of the phosphor layer due to moisture entering the layer from the outside can be suppressed. Therefore, an illumination apparatus having a wider selection range of a phosphor material and high reliability can be obtained.

Further, the illumination apparatus according to the embodiment of the present invention further includes an antireflection layer disposed on a surface of the phosphor layer opposed to a surface thereof on the first surface side of the transparent substrate.

The provision of the antireflection layer as described above can additionally improve luminance of the illumination apparatus. Specifically, while there is light that is reflected at an interface between the phosphor layer and air and is thus not emitted from the emitting surface of the illumination apparatus, that is, while there is a loss of light in the case where no antireflection layer is provided, the loss of light due to the light reflection at the interface between the phosphor layer and air as described above can be suppressed by providing the antireflection layer, thereby improving luminance of the illumination apparatus.

According to another embodiment of the present invention, there is provided an illumination apparatus including a light guide plate, a plurality of light-emitting devices, a phosphor layer, and an optical wavelength selection filter layer. The plurality of light-emitting devices are disposed along an end portion of the light guide plate and are each configured to emit light of a first wavelength. The optical wavelength selection filter layer is configured to transmit the light of the first wavelength therethrough and reflect light of a second wavelength that is emitted from the phosphor layer by being excited by the light of the first wavelength. The phosphor layer and the optical wavelength selection filter layer are disposed between the light guide plate and the plurality of light-emitting devices in the stated order from the light guide plate side.

In the embodiment of the present invention, because the optical wavelength selection filter layer is provided, excitation light from the light-emitting device can be introduced into the phosphor layer with a low loss, and light that is not emitted from the emitting surface of the illumination apparatus among the light whose color has been converted by the phosphor layer is reflected by the optical wavelength selection filter layer so as to be reused. Thus, an illumination apparatus with a high light efficiency and improved luminance can be obtained.

According to another embodiment of the present invention, there is provided a color conversion device including a transparent substrate, a phosphor layer, and an optical wavelength selection filter layer. The transparent substrate includes a first surface and a second surface opposing each other. The phosphor layer is disposed on the first surface side of the transparent substrate. The optical wavelength selection filter layer is disposed on the second surface side of the transparent substrate and configured to transmit light of a first wavelength therethrough and reflect light of a second wavelength.

By incorporating such a color conversion device according to the embodiment of the present invention into the illumination apparatus that uses the light-emitting device that emits light of the first wavelength as the light source, excitation light from the light-emitting device can be introduced into the phosphor layer with a low loss, and light that is not emitted from the emitting surface of the illumination apparatus among the light whose color has been converted by the phosphor layer is reflected by the optical wavelength selection filter layer so as to be reused. Thus, an illumination apparatus with a high light efficiency and improved luminance can be obtained.

According to another embodiment of the present invention, there is provided a display apparatus including a display panel and an illumination apparatus provided adjacent to the display panel. The illumination apparatus includes a transparent substrate, a phosphor layer, an optical wavelength selection filter layer, and a light-emitting device. The transparent substrate includes a first surface and a second surface opposing each other. The phosphor layer is disposed on the first surface side of the transparent substrate. The optical wavelength selection filter layer is disposed on the second surface side of the transparent substrate and configured to transmit light of a first wavelength therethrough and reflect light of a second wavelength that is emitted from the phosphor layer by being excited by the light of the first wavelength. The light-emitting device is configured to emit the light of the first wavelength from the optical wavelength selection filter layer side thereof toward the optical wavelength selection filter layer.

In the embodiment of the present invention, because an illumination apparatus that includes an optical wavelength selection filter layer is used, a display apparatus with improved luminance and excellent display quality can be obtained.

As described above, according to the embodiments of the present invention, an illumination apparatus with less loss of light and improved luminance can be obtained, and by using such an illumination apparatus, a display apparatus with excellent display quality can be obtained.

These and other objects, features and advantages of the present invention will become more apparent in light of the following detailed description of best mode embodiments thereof, as illustrated in the accompanying drawings.

BRIEF DESCRIPTION OF DRAWINGS

FIG. 1 are a schematic plan view of a light-emitting device substrate partially constituting an illumination apparatus according to an embodiment of the present invention and a schematic cross-sectional diagram of the illumination apparatus;

DESCRIPTION OF PREFERRED EMBODIMENTS

Hereinafter, embodiments of the present invention will be described with reference to the drawings. In the embodiments below, a display apparatus including an illumination apparatus of the present invention is applied to a liquid crystal television.

It should be noted that an application range of the display apparatus according to the present invention is not limited to the liquid crystal television. The display apparatus only needs to be a display apparatus that includes an illumination apparatus and thus can widely be applied to, for example, a personal computer and a PDA (Personal Digital Assistant).

Figure 19:
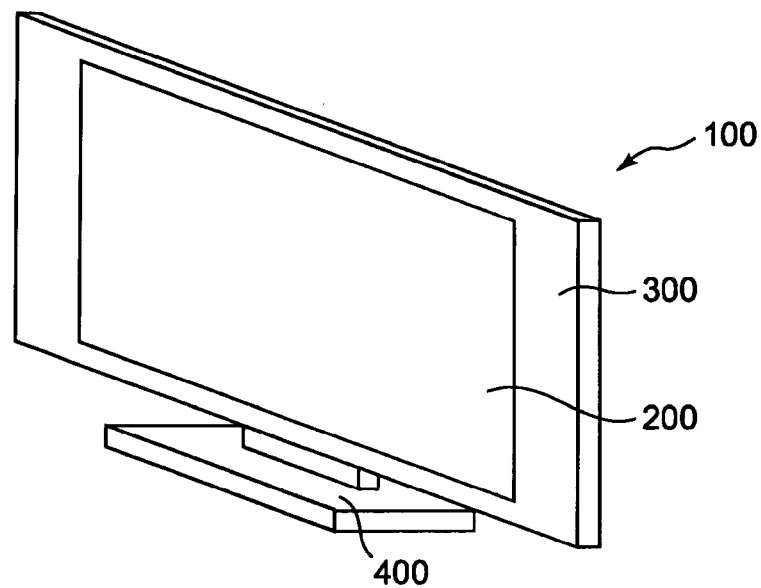
FIG. 19 is a schematic perspective diagram of a liquid crystal television.
Figure 20:
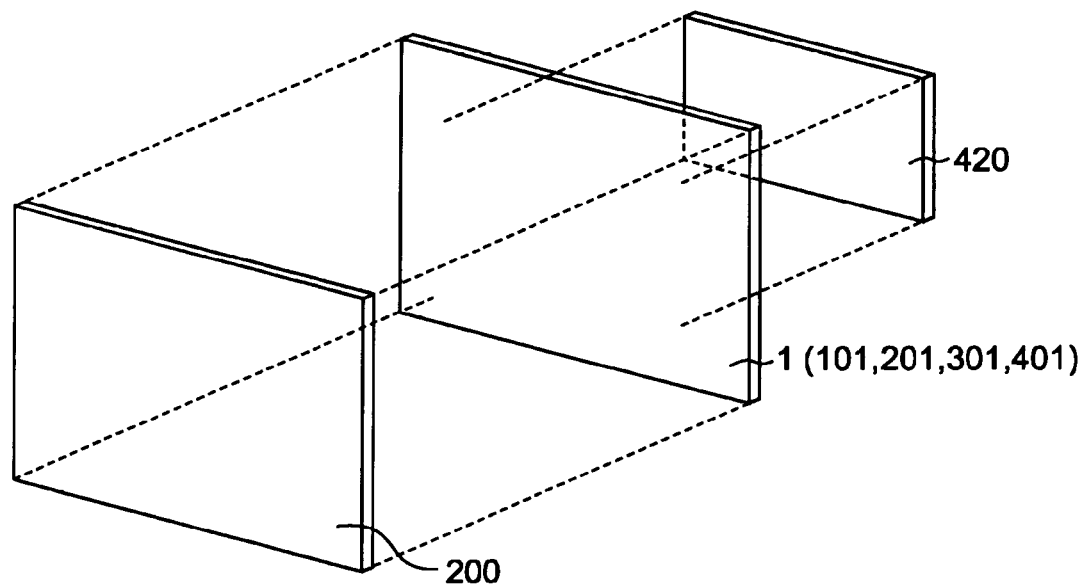
FIG. 20 is an exploded perspective diagram schematically showing a part retained by a casing of the liquid crystal television.

FIG. 19 is a schematic perspective diagram of a liquid crystal television 100 as the display apparatus of the present invention. FIG. 20 is an exploded perspective diagram schematically showing a part retained by a casing 300 of the liquid crystal television 100. As shown in the figures, the liquid crystal television 100 includes a liquid crystal panel 200 as a display panel, an illumination apparatus 1 (101, 201, 301, 401), a driving circuit 420 for driving the liquid crystal panel 200, the casing 300 for retaining the liquid crystal panel 200, the illumination apparatus 1, and the driving circuit 420, and a stand 400 for retaining the casing 300. The illumination apparatus 1 illuminates an image display region of the liquid crystal panel 200 from a back surface and emits white light.

First Embodiment

Hereinafter, referring to FIGS. 1 to 7, an illumination apparatus according to an embodiment of the present invention will be described as a first embodiment.

Figure 2:
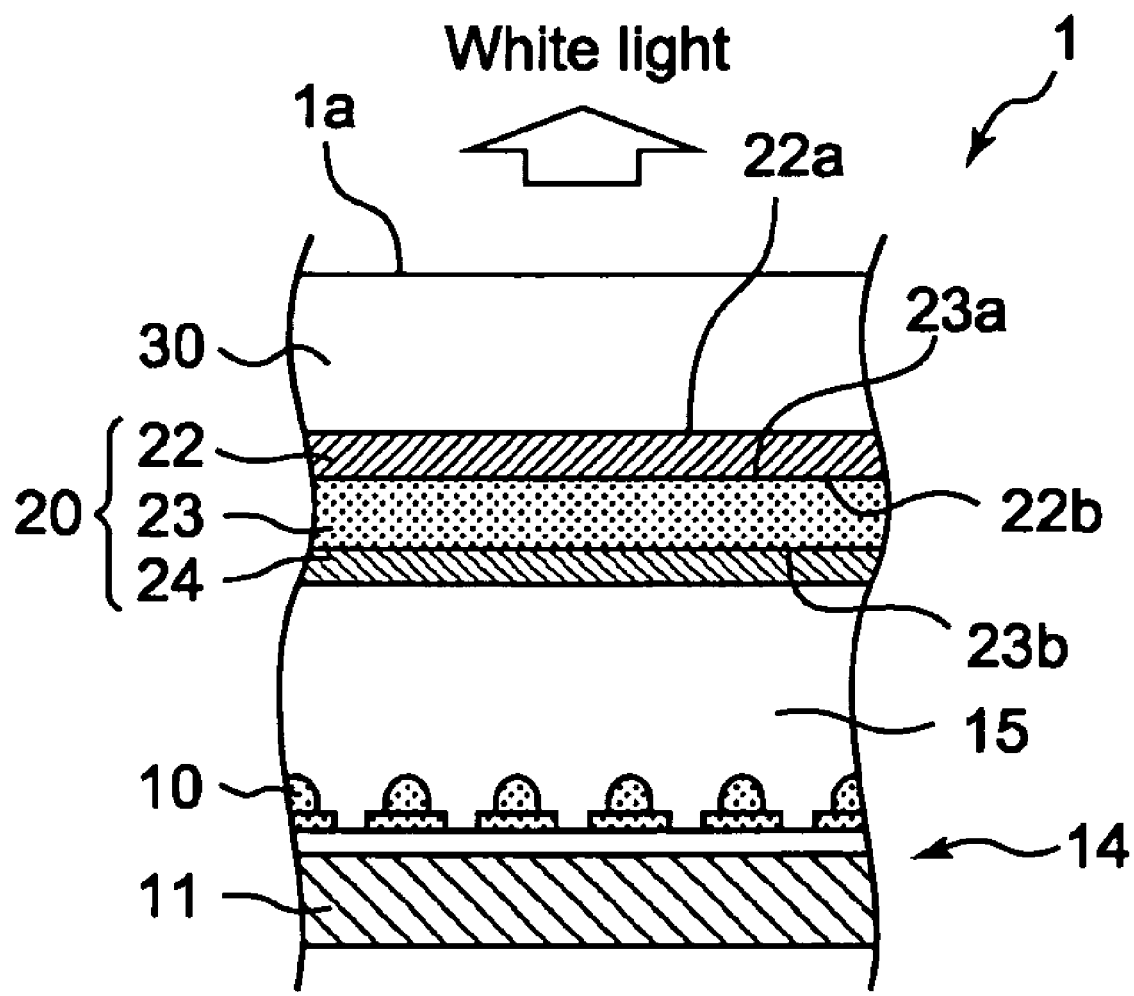
FIG. 2 is a partially-enlarged cross-sectional diagram of the illumination apparatus.
Figure 3:
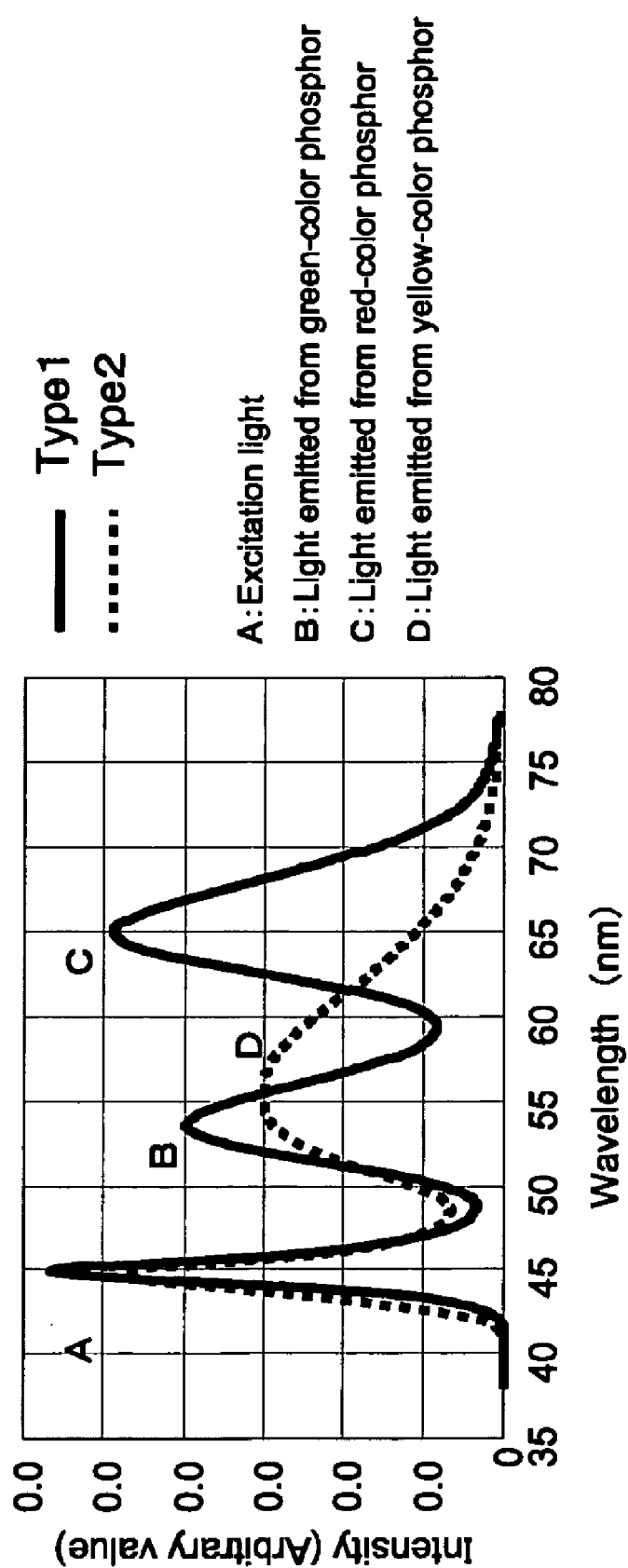
FIG. 3 is a diagram showing optical characteristics of white light obtained by the illumination apparatus.
Figure 4:
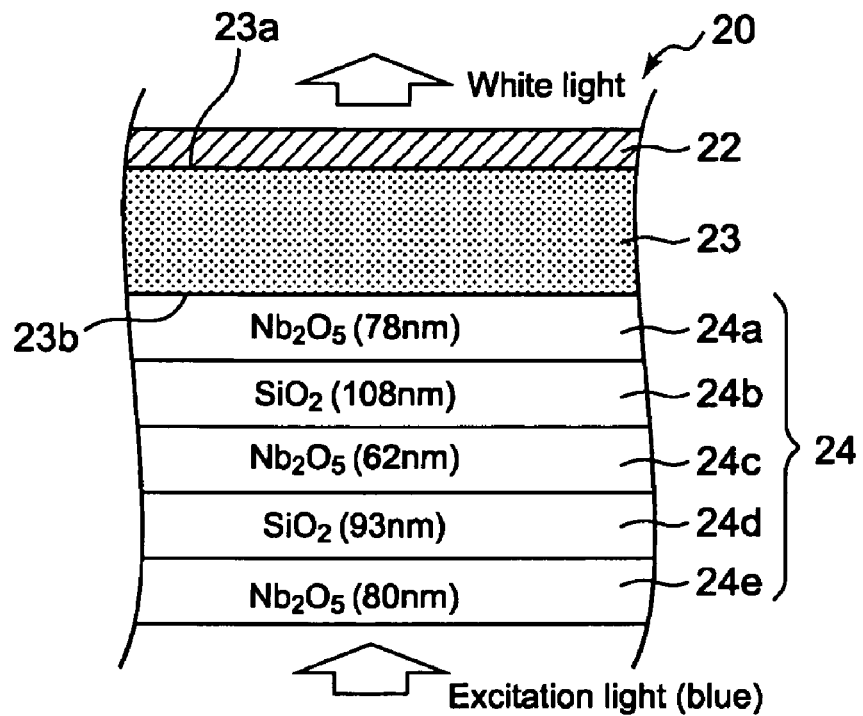
FIG. 4 is a partially-enlarged cross-sectional diagram of a sheet-type color conversion device.
Figure 5:
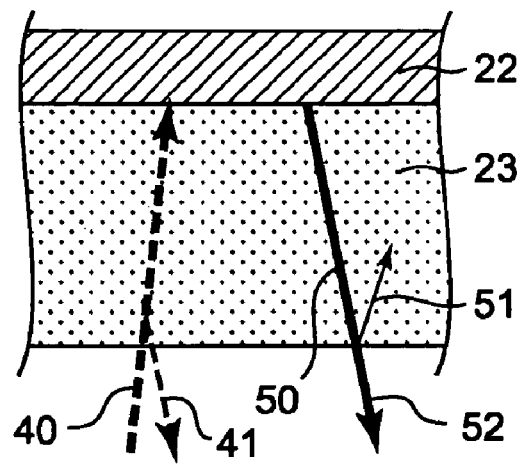
FIG. 5 is a diagram showing an optical path of light of the sheet-type color conversion device in a case where an optical wavelength selection filter layer is not provided.
Figure 6:
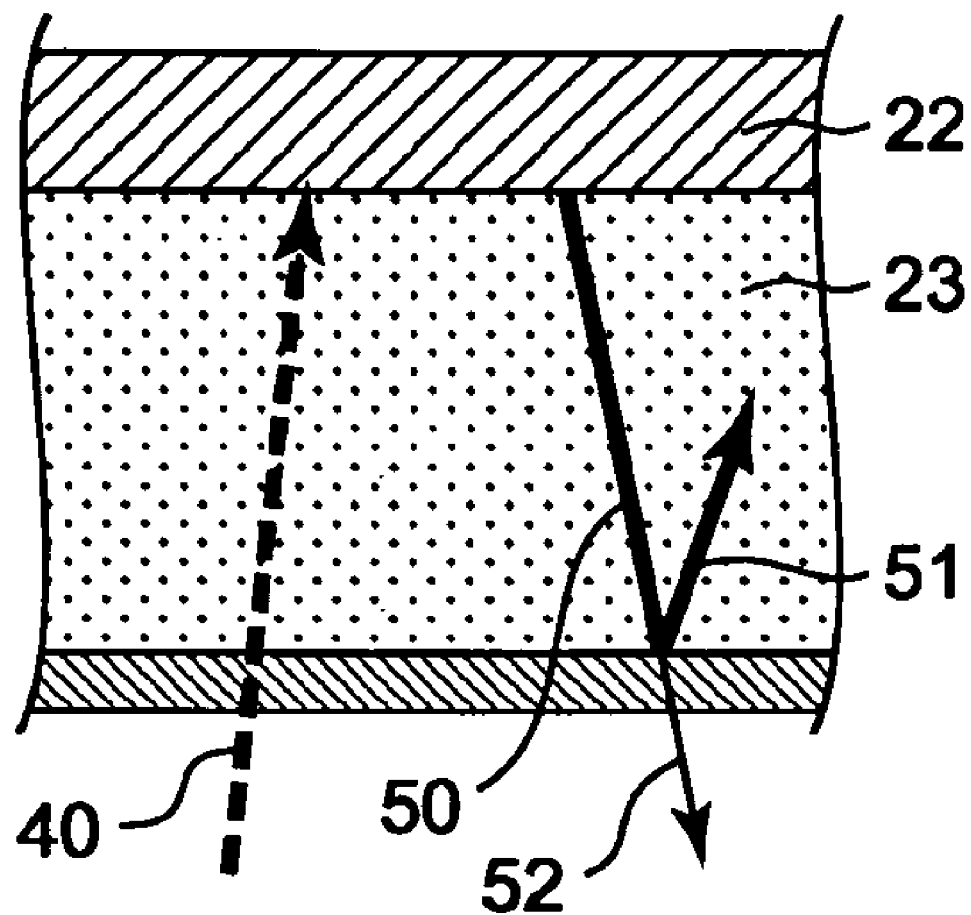
FIG. 6 is a diagram showing an optical path of light of the sheet-type color conversion device in a case where the optical wavelength selection filter layer is provided.
Figure 7:
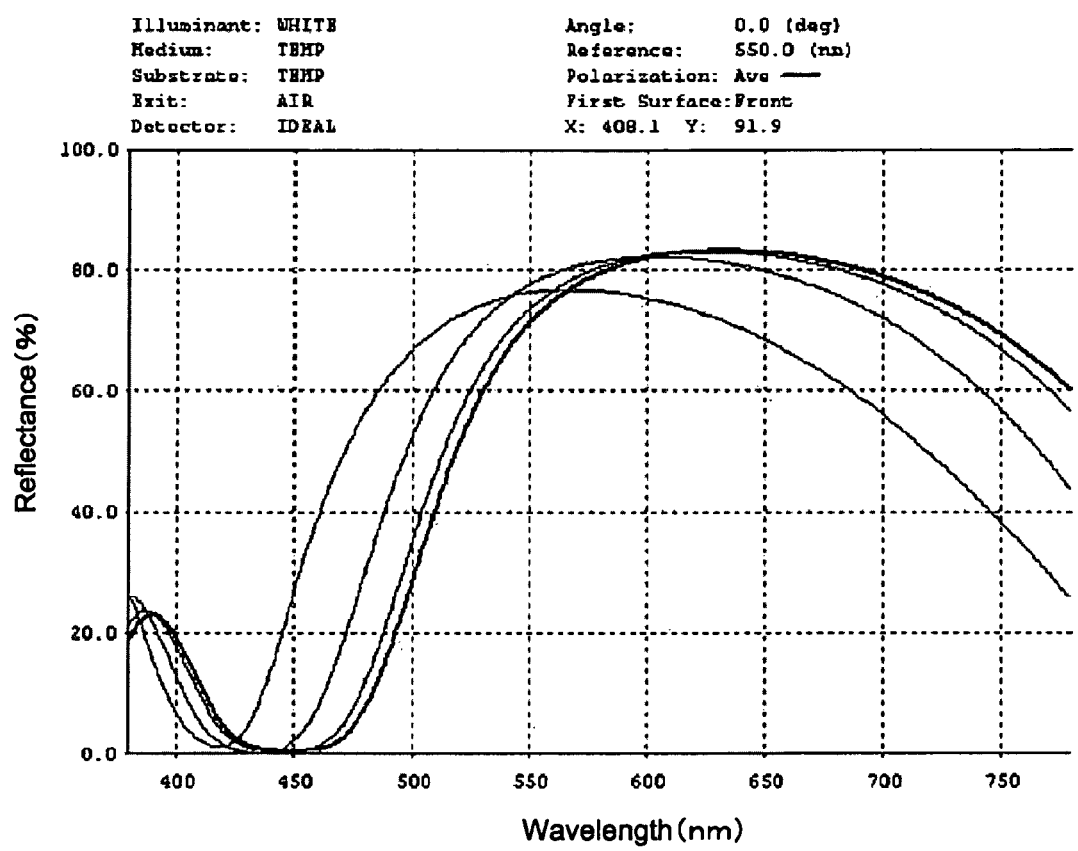
FIG. 7 is a diagram showing optical characteristics of the sheet-type color conversion device.
Figure 8:
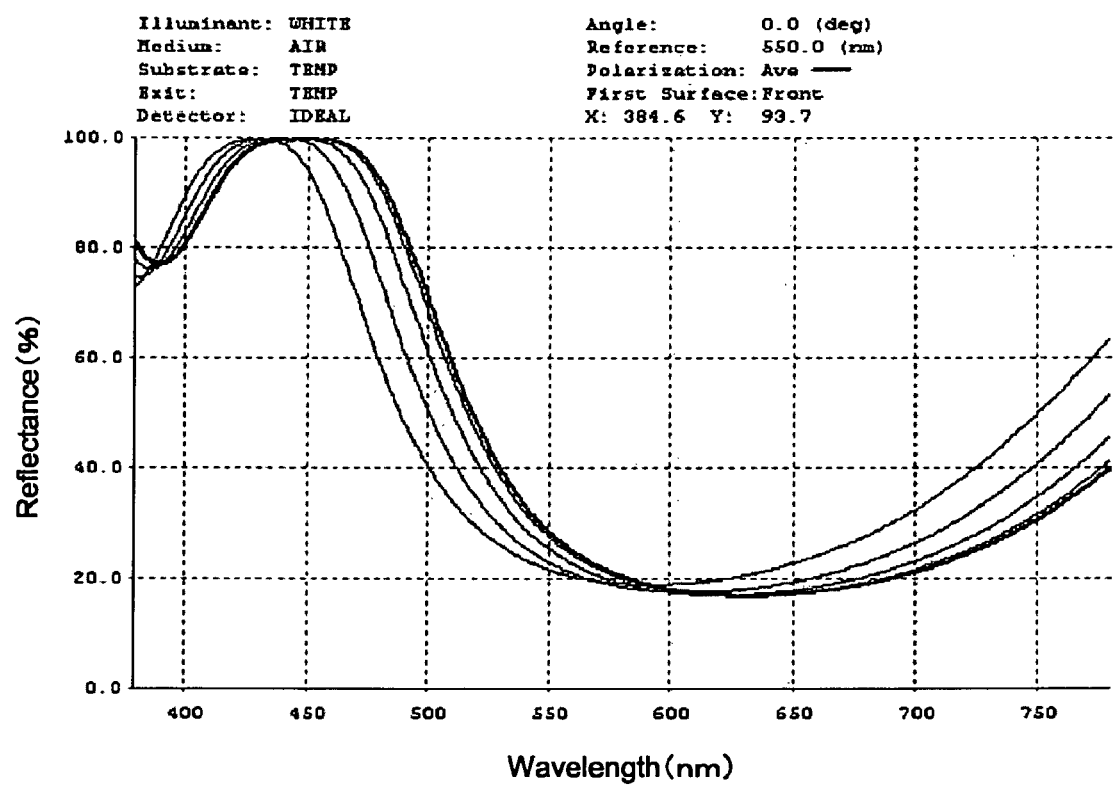
FIG. 8 is a diagram showing optical characteristics of the sheet-type color conversion device.

FIG. 1A is a schematic plan view of a light-emitting device substrate 14 partially constituting the illumination apparatus 1, and FIG. 1B is a schematic cross-sectional diagram of the illumination apparatus 1. FIG. 2 is a partially-enlarged cross-sectional diagram of the illumination apparatus 1. FIG. 3 is a diagram showing optical characteristics of a sheet-type color conversion device. FIG. 4 is a partially-enlarged cross-sectional diagram of a sheet-type color conversion device 20 partially constituting the illumination apparatus 1. FIG. 5 is a diagram showing an optical path of light in a case where an optical wavelength selection filter layer is not provided, and FIG. 6 is a diagram showing an optical path of light in a case where the optical wavelength selection filter layer is provided. FIGS. 7 and 8 are diagrams each showing optical characteristics of the sheet-type color conversion device 20 shown in FIG. 4. FIG. 7 shows a relationship between a wavelength and reflectance, and FIG. 8 shows a relationship between the wavelength and a transmittance.

As shown in FIGS. 1, the illumination apparatus 1 includes the light-emitting device substrate 14 whose shape of a plane is a rectangle, reflection plates 13, the sheet-type color conversion device 20 whose shape of a plane is a rectangle, and a diffusion plate 30 whose shape of a plane is a rectangle. The light-emitting device substrate 14 and the sheet-type color conversion device 20 are apart from each other by about 20 mm (distance shown in FIG. 1A), and a gap 15 therebetween is retained by a plurality of supporting columns 12 and reflection plates 13. The reflection plates 13 are disposed so as to surround a space formed between the light-emitting device substrate 14 and the sheet-type color conversion device 20 on all four sides. By providing the reflection plates 13, excitation light from blue-light-emitting diodes 10 as light-emitting devices is, even when led to an end portion of the illumination apparatus 1, reflected by the reflection plates 13 so that the light can be reused, resulting in a favorable light efficiency. The diffusion plate 30 is disposed above the sheet-type color conversion device 20. A side of the illumination apparatus 1 on which the diffusion plate 30 is disposed is a light-emitting surface 1a, and in the case of the liquid crystal television 100, the illumination apparatus 1 is disposed such that the light-emitting surface 1a side thereof is positioned on a side of the liquid crystal panel 200 as a display screen. The illumination apparatus 1 of this embodiment is used in a large 46-inch liquid crystal television, for example, and is 570 mm long and 1,020 mm wide.

The light-emitting device substrate 14 includes a substrate 11 constituted of a glass epoxy board (FR-4) in which an epoxy resin is infiltrated into a glass-woven cloth obtained by weaving a glass fiber into a form of a cloth, and a total of 3,200 blue-light-emitting diodes 10 (40×80) disposed at a regular interval of 12 mm on the substrate 11. The plurality of blue-light-emitting diodes 10 are disposed in correspondence with an entire surface of a transparent substrate 23 of the sheet-type color conversion device 20. InGa-based blue-light-emitting diodes 10 are used.

As shown in FIG. 2, the sheet-type color conversion device 20 includes the transparent substrate 23 having a first surface 23a and a second surface 23b opposing each other and that is formed of PET (polyethylene terephthalate) or the like, a phosphor layer 22 as a color conversion layer disposed on the first surface 23a of the transparent substrate 23, and an optical wavelength selection filter layer 24 disposed on the second surface 23b.

The transparent substrate 23 has a refractive index n of 1.6 and a film thickness of 100 μm.

The phosphor layer 22 has a first surface 22a and a second surface 22b opposing each other, and the diffusion plate 30 is disposed on the first surface 22a side thereof whereas the transparent substrate 23 is disposed on the second surface 22b side thereof.

The phosphor layer 22 contains two types of phosphors, that is, a green-color phosphor for emitting green light of a green-color wavelength as a second wavelength by being excited by blue light of a blue-color wavelength as a first wavelength emitted from the blue-light-emitting diodes 10, and a red-color phosphor for emitting red light of a red-color wavelength as the second wavelength by being excited by the blue light. Accordingly, the green light and the red light the colors of which have been converted by the phosphor layer 22 are mixed with the blue light as the excitation light from the blue-light-emitting diodes 10, whereby white light is generated and is diffused by the diffusion plate 30 to be emitted from the light-emitting surface 1a.

Optical wavelength characteristics of the white light obtained by the illumination apparatus 1 of this embodiment are indicated by a solid line in FIG. 3 as Type 1. Three peaks respectively indicate blue light as the excitation light, green light emitted form the green-color phosphor, and red light emitted from the red-color phosphor. The figure shows that a main light emission peak of the blue light is about 450 nm, that of the green light is about 530 nm, and that of the red light is about 650 nm.

It should be noted that a method of obtaining white light is not limited to that described above. For example, a phosphor layer containing a yellow-color phosphor for emitting yellow light of a yellow-color wavelength as the second wavelength by being excited by the blue light of the blue-color wavelength as the first wavelength emitted from the blue-light-emitting diodes 10 may also be used. Accordingly, the yellow light whose color has been converted by the phosphor layer and the blue light are mixed to thus provide white light. The optical wavelength characteristics of the white light in this case are indicated by a broken line in FIG. 3 as Type 2. The two peaks respectively indicate the blue light and the yellow light obtained from the yellow-color phosphor. The figure shows that the main light emission peak of the blue light is about 450 nm and that of the yellow light is about 540 to 560 nm.

Moreover, although the blue-light-emitting diode is used as the light-emitting device in this case, the present invention is not limited thereto. For example, there may also be used a phosphor layer that contains, while using a purple (near ultraviolet)-light-emitting diode instead of the blue-light-emitting diode, the red-color phosphor for emitting red light of the red-color wavelength as the second wavelength by being excited by purple (near ultraviolet) light of a purple-color (near ultraviolet) wavelength as the first wavelength emitted from the purple (near ultraviolet)-light-emitting diodes, the green-color phosphor for emitting green light of the green-color wavelength as the second wavelength by being excited by the purple (near ultraviolet) light, and a blue-color phosphor for emitting blue light of the blue-color wavelength as the second wavelength by being excited by the purple (near ultraviolet) light. Accordingly, the red light, green light, and blue light the colors of which have been converted by the phosphor layer are mixed with the purple (near ultraviolet) light so as to provide white light.

Further, although white light is obtained in this embodiment, it is also possible to appropriately select types of light-emitting devices and phosphors for obtaining light of a desired color as light to be emitted from the illumination apparatus.

As the phosphor layer 22, one in which $SrGa_2S_4:Eu^{2+}$ as the green-color phosphor and $(Ca, Sr, Ba) S:Eu^{2+}$ as the red-color phosphor are dispersed within a binder constituted of a polyvinyl butyral resin, for example, is used. In the descriptions on phosphor materials, the prefix of ":" represents a matrix whereas the suffix thereof represents an activator.

As shown in FIG. 4, the optical wavelength selection filter layer 24 is constituted of a lamination film obtained by laminating a first niobium pentoxide ($Nb_2O_5$) film 24a, a first silicon dioxide ($SiO_2$) film 24b, a second niobium pentoxide film 24c, a second silicon dioxide film 24d, and a third niobium pentoxide film 24e in the stated order from the transparent substrate 23 side. The first niobium pentoxide film 24a, the first silicon dioxide film 24b, the second niobium pentoxide film 24c, the second silicon dioxide film 24d, and the third niobium pentoxide film 24e have film thicknesses of 78 nm, 108 nm, 62 nm, 93 nm, and 80 nm, respectively. The niobium pentoxide films each have a refractive index n of 2.3, and the silicon dioxide films each have a refractive index n of 1.46. By thus laminating the films having different refractive indices, an optical wavelength selection filter layer 24 having a function of transmitting light of the first wavelength (blue-color wavelength in this case) therethrough and reflecting light of the second wavelength (red- and green-color wavelengths in this case) can be obtained.

The optical wavelength selection filter layer 24 is a layer that transmits blue light as the excitation light therethrough and reflects light that enters the transparent substrate 23 side out of the light whose color has been converted by the phosphor layer 22. Referring to FIGS. 5 and 6, descriptions will be given on a difference in optical paths between a case where the optical wavelength selection filter layer 24 is provided and a case where the optical wavelength selection filter layer 24 is not provided. FIG. 5 shows the case where the optical wavelength selection filter layer 24 is not provided and FIG. 6 shows the case where the optical wavelength selection filter layer 24 is provided.

In the case where the optical wavelength selection filter layer 24 is not provided as shown in FIG. 5, excitation light 40 from the blue-light-emitting diodes 10 is partially reflected by the transparent substrate 23 to generate light 41, and the rest enters the transparent substrate 23. By the light that has entered the transparent substrate 23 transmitting through the transparent substrate 23 and entering the phosphor layer 22, the phosphors are excited to thus emit red and green light. Light 50 as light other than that emitted from the light-emitting surface 1a among the light whose color has been thus converted enters the transparent substrate 23, is mostly transmitted therethrough to generate light 52, and is partially reflected thereby to generate light 51. The light 52 exits to the outside, and the light 51 is reflected by the transparent substrate 23.

In contrast, in the case where the optical wavelength selection filter layer 24 is provided as shown in FIG. 6, most of the excitation light 40 from the blue-light-emitting diodes 10 enters the transparent substrate 23. By the light that has entered the transparent substrate 23 transmitting therethrough and entering the phosphor layer 22, the phosphors within the phosphor layer 22 are excited to thus emit red and green light. The light 50 as light other than that emitted from the light-emitting surface 1a among the light whose color has been thus converted takes an optical path toward the transparent substrate 23, but a large proportion (light 51) of the light 50 is reflected by the optical wavelength selection filter layer 24. The reflected light 51 re-enters the phosphor layer 22, and while a part thereof is emitted from the light-emitting surface 1a, the rest takes an optical path toward the transparent substrate 23 but is reflected again by the optical wavelength selection filter layer 24 to thus re-enter the phosphor layer 22. By repeating this process, the light whose color has been converted by the phosphor layer 22 is reflected by the optical wavelength selection filter layer 24 even when the optical path toward the transparent substrate 23 is taken, whereby light can be reused to thus suppress a loss of light.

Therefore, by disposing the optical wavelength selection filter layer 24 on the side the excitation light enters in the sheet-type color conversion device 20, the excitation light from the blue-light-emitting diodes 10 can be introduced into the phosphor layer 22 with a low loss, and the light reflected by the optical wavelength selection filter layer 24 among the light whose color has been converted by the phosphor layer 22 can be reused. Thus, an illumination apparatus 1 with a favorable light efficiency and improved light extraction efficiency with respect to the light-emitting surface and luminance can be obtained.

Table 1 shows a difference in reflectance between the case where the optical wavelength selection filter layer 24 is provided and the case where the optical wavelength selection filter layer 24 is not provided at respective wavelengths, and FIG. 7 shows a relationship between the wavelength and reflectance of the sheet-type color conversion device 20 including the optical wavelength selection filter layer 24. Moreover, Table 2 shows a difference in transmittances of blue light (450 nm) between the case where the optical wavelength selection filter layer 24 is provided and the case where the optical wavelength selection filter layer 24 is not provided, and FIG. 8 shows a relationship between the wavelength and transmittance of the sheet-type color conversion device 20 including the optical wavelength selection filter layer 24. In Tables 1 and 2, the structure provided with the optical wavelength selection filter layer 24 has the phosphor layer 22 disposed on one surface of the transparent substrate 23 and the optical wavelength selection filter layer 24 on the other surface, whereas the structure not provided with the optical wavelength selection filter layer 24 merely has the phosphor layer 22 disposed on one surface of the transparent substrate 23. In either case, the blue-light-emitting diodes 10 are disposed on a side of the surface opposed to the surface on which the phosphor layer 22 is disposed. In Table 1 and FIG. 7, the reflectance indicates reflectance of light whose color has been converted by the phosphor layer 22, and the incidence angle indicates angles of light when emitted from the phosphor layer 22. In Table 2 and FIG. 8, the transmittance indicates a ratio of light at which the excitation light enters the transparent substrate 23, and the incidence angle indicates angles by which the excitation light enters the optical wavelength selection filter layer or the transparent substrate.

TABLE 1

| | Reflectance (%) at 535 nm | | Reflectance (%) at 650 nm | |
|---|---|---|---|---|
| Incidence angle | Without optical wavelength selection filter | With optical wavelength selection filter | Without optical wavelength selection filter | With optical wavelength selection filter |
| 0° | 5.3 | 63.7 | 5.3 | 82.9 |
| 10° | 5.3 | 67.0 | 5.3 | 82.5 |
| 20° | 5.6 | 73.7 | 5.6 | 79.9 |
| 30° | 8.0 | 75.0 | 8.0 | 68.5 |
| 40° | 100 | 100 | 100 | 100 |

TABLE 2

| | Transmittance (%) at 450 nm | |
|---|---|---|
| Incidence angle | Without optical wavelength selection filter | With optical wavelength selection filter |
| 0° | 94.7 | 99.6 |
| 10° | 94.7 | 99.6 |
| 20° | 94.6 | 99.7 |
| 30° | 94.5 | 98.9 |
| 40° | 94.0 | 93.9 |

As shown in Table 1, it can be seen that the provision of the optical wavelength selection filter layer 24 leads to an improvement in the reflectance of red and green light. Therefore, because the illumination apparatus including the optical wavelength selection filter layer 24 can reuse reflected light, light efficiency and luminance are improved. Moreover, as shown in Table 2, because the transmittance of the excitation light from the blue-light-emitting diodes is also enhanced, the luminance of the illumination apparatus 1 is improved.

As described above, by laminating two types of films that are transparent in the visible light region and have different refractive indices, the optical wavelength selection filter layer 24 is provided the function of transmitting blue light therethrough and reflecting red and green light the colors of which have been converted by the phosphor layer 22. As the films having different refractive indices as described above, it is desirable that the refractive index of one of the film materials be 2.0 or more like within a range of 2.0 to 2.5, and the refractive index of the other one of the film materials be 1.5 or less like within a range of 1.2 to 1.5. In this embodiment, the niobium pentoxide film and the silicon dioxide film are exemplified as the film with a high refractive index and the film with a low refractive index, respectively. However, as the film with a high refractive index, for example, $HfO_2$, $Nd_2O_5$, $ZrO_2$, $Si_3N_4$, AlN, $Ta_2O_5$, $TiO_2$, $CeO_2$, ZnS, and $Sb_2O_3$ each of which has a refractive index of 2.0 or more can be used. Moreover, as the film with a low refractive index, for example, $CaF_2$, $MgF_2$, LiF, and $SiO_2$ each of which has a refractive index of 1.5 or less can be used.

In this embodiment, film thicknesses of the films 24a to 24e constituting the optical wavelength selection filter layer 24 are determined as follows. In the case of laminating the high-refractive-index film and the low-refractive-index film alternately, by setting $d=\lambda_o/(4n)$, waves reflected at a boundary between the films are canceled out, thus reducing transmittance. Here, d represents the film thickness and $\lambda_o$ represents the wavelength of light to be reflected. In this embodiment, because the red and green light is reflected, calculations using a wavelength of 600 nm positioned in-between as a reflection peak are as follows.

In the case of niobium pentoxide (n=2.3)

$d=600/9.2 \approx 65$ (nm)

In the case of silicon dioxide (n=1.46)

$d=600/5.84 \approx 100$ (nm)

First, lamination films of niobium pentoxide (65 nm)/silicon dioxide (100 nm)/niobium pentoxide (65 nm)/silicon dioxide (100 nm)/niobium pentoxide (65 nm) are designed, and the film thicknesses thereof are finely adjusted so as to lower the reflectance of blue light in the vicinity of the wavelength 450 nm, to eventually design an optical wavelength selection filter layer 24 constituted of the lamination films having the film thicknesses as described above with the optical characteristics as shown in FIGS. 7 and 8.

Second Embodiment

In the sheet-type color conversion device 20 of the first embodiment, although the phosphor layer 22 contains two types of phosphors, that is, the green-color phosphor and the red-color phosphor, phosphor layers may be disposed individually for each phosphor.

Figure 9:
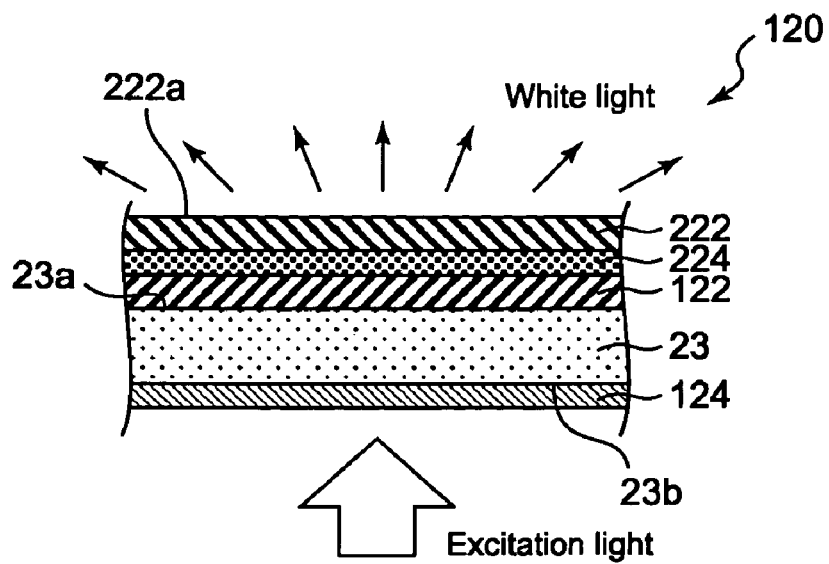
FIG. 9 is a partially-enlarged cross-sectional diagram of a sheet-type color conversion device according to another embodiment of the present invention.

Hereinafter, descriptions will be given while referring to FIG. 9. FIG. 9 is a partially-enlarged cross-sectional diagram of a sheet-type color conversion device 120 according to a second embodiment of the present invention. Structures the same as those of the above embodiment are denoted by the same reference symbols, and descriptions thereof will be omitted.

As shown in FIG. 9, the sheet-type color conversion device 120 includes the transparent substrate 23 having the first surface 23a and the second surface 23b opposing each other, a first phosphor layer 122, a second optical wavelength selection filter layer 224, and a second phosphor layer 222 disposed on the first surface 23a of the transparent substrate 23 in the stated order from the first surface 23a side, and a first optical wavelength selection filter layer 124 disposed on the second surface 23b.

The first phosphor layer 122 contains a red-color phosphor for emitting red light by being excited by blue light emitted from the blue-light-emitting diodes. The second phosphor layer 222 contains a green-color phosphor for emitting green light by being excited by the blue light emitted from the blue-light-emitting diodes.

The first optical wavelength selection filter layer 124 may be the same as the optical wavelength selection filter layer 24 used in the first embodiment, or may be a filter that transmits blue light therethrough and reflects only red light. The second optical wavelength selection filter layer 224 is a filter that transmits blue and red light therethrough and reflects only green light.

It should be noted that the first phosphor layer 122 may contain the green-color phosphor and the second phosphor layer 222 may contain the red-color phosphor. In this case, it is only necessary that a filter the same as the optical wavelength selection filter layer 24 shown in the first embodiment or a filter that transmits blue light therethrough and reflects only green light be used as the first optical wavelength selection filter layer 124. In addition, it is only necessary that a filter that transmits blue and green light therethrough and reflects only red light be used as the second optical wavelength selection filter layer 224.

Even with such a structure, an illumination apparatus with a less loss of light, favorable light efficiency, and improved luminance can be obtained.

Third Embodiment

Figure 10:
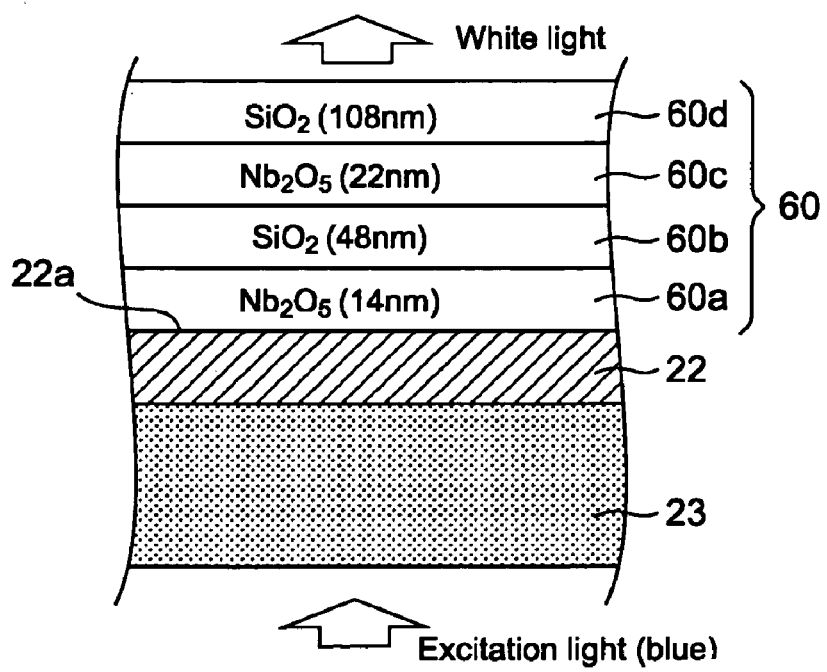
FIG. 10 is a partially-enlarged cross-sectional diagram of a sheet-type color conversion device including an antireflection layer according to another embodiment of the present invention.
Figure 11:
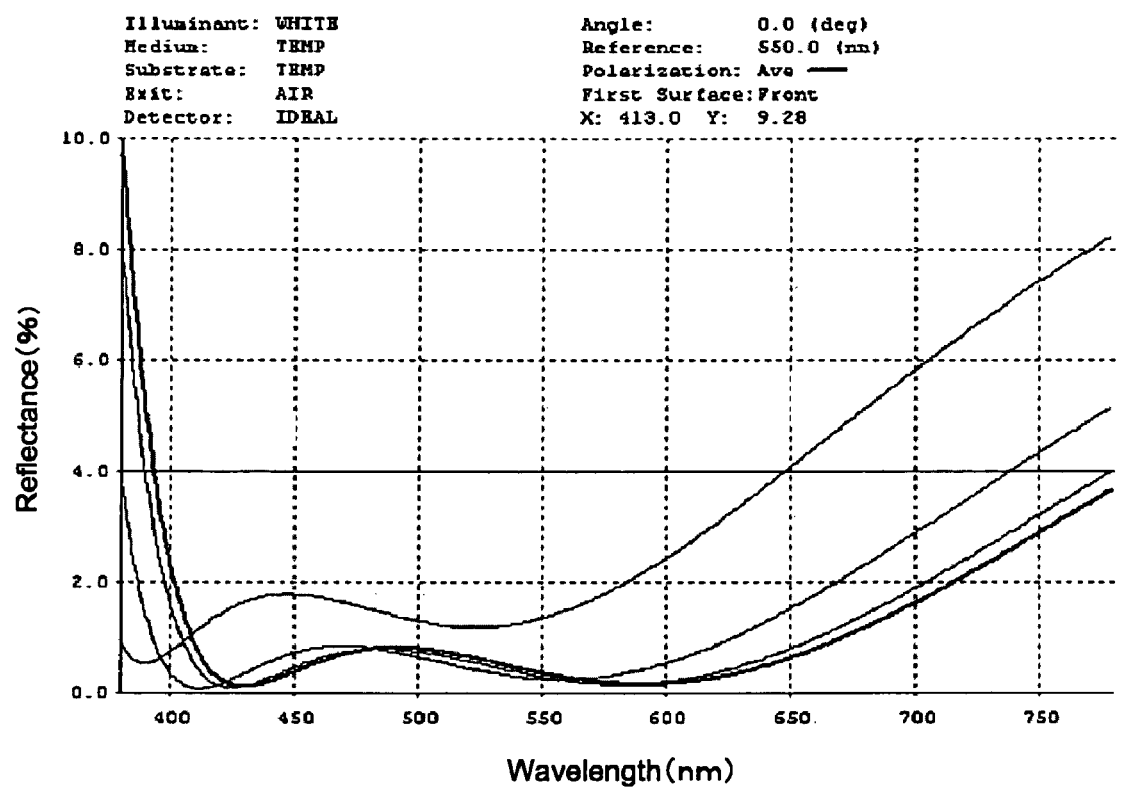
FIG. 11 is a diagram showing optical characteristics of the sheet-type color conversion device shown in FIG. 10.

FIG. 10 is a partially-enlarged cross-sectional diagram of a sheet-type color conversion device according to a third embodiment of the present invention. It should be noted that in FIG. 10, an illustration of the optical wavelength selection filter layer 24 is omitted. FIG. 11 shows optical characteristics of the sheet-type color conversion device of this embodiment.

As shown in FIG. 10, the sheet-type color conversion device of this embodiment includes, in addition to the structure of the sheet-type color conversion device 20 of the first embodiment, an antireflection layer 60 on the first surface 22a side of the phosphor layer 22. It should be noted that when providing the sheet-type color conversion device 120 of the second embodiment, the antireflection layer only needs to be disposed on the first surface 222a side of the second phosphor layer 222.

The antireflection layer 60 is provided for improving a light extraction efficiency of light from the phosphor layer 22, and is designed to transmit therethrough blue, red, and green light that has passed through the phosphor layer 22 and reduce a loss of blue, red, and green light emitted from the light-emitting surface as compared to the case where no antireflection layer is provided. Accordingly, the luminance of the illumination apparatus can be additionally improved.

The antireflection layer 60 is constituted of a lamination film obtained by laminating films having different refractive indices like the optical wavelength selection filter layer 24, and the lamination film is desirably formed of a combination of a material having a refractive index of 1.5 or less like within a range of 1.2 to 1.5 and a material having a refractive index of 2.0 or more like within a range of 2.0 to 2.5. The antireflection layer 60 according to this embodiment is constituted of a lamination film obtained by laminating a first niobium pentoxide (14 nm) film 60a, a first silicon dioxide (48 nm) film 60b, a second niobium pentoxide (22 nm) film 60c, and a second silicon dioxide (108 nm) film 60d in the stated order from the phosphor layer 22 side.

As shown in FIG. 11, reflectance of the antireflection layer 60 in the visible light region (400 to 700 nm) is lowered. Table 3 shows the reflectance in the visible light region (400 to 700 nm) in both cases where the antireflection layer 60 is and is not provided.

TABLE 3

| | Reflectance (%) in visible light region (400 to 700 nm) | |
|---|---|---|
| Incidence angle | Without antireflection layer | With antireflection layer |
| 0° | 4.0 | 0.58 |
| 10° | 4.0 | 0.60 |
| 20° | 4.2 | 0.84 |
| 30° | 5.5 | 2.4 |
| 40° | 24.5 | 22.1 |

As shown in Table 3, provision of the antireflection layer 60 leads to an improvement of the light extraction efficiency and luminance of the illumination apparatus. Specifically, while there is a loss of light in the case where the antireflection layer 60 is not provided since light is reflected at an interface between the phosphor layer and air and some of the light is thus not emitted from the light-emitting surface, by providing the antireflection layer 60, the loss of light due to the reflection of light at the interface between the phosphor layer and air as described above can be suppressed, thus improving the luminance of the illumination apparatus.

Figure 12:
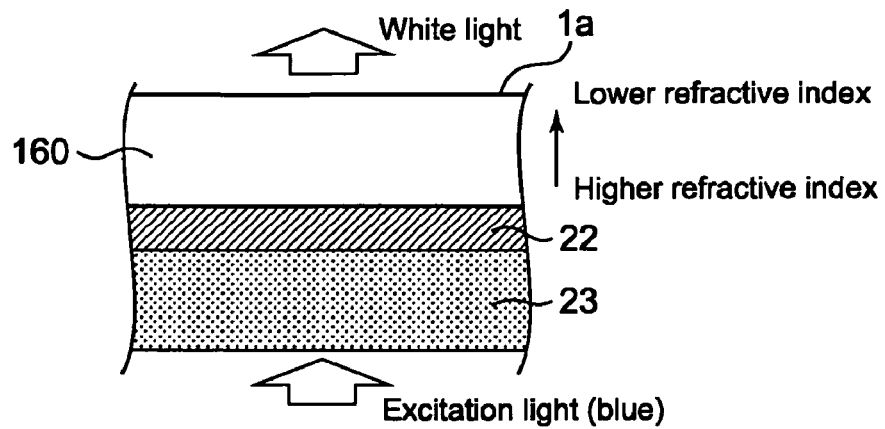
FIG. 12 is a partially-enlarged cross-sectional diagram showing a modification of the sheet-type color conversion device including the antireflection layer.

This embodiment uses, as the antireflection layer 60, a lamination layer obtained by laminating films having different refractive indices. However, as a modification of the antireflection layer 60, there may be provided an antireflection layer 160 constituted of an inclined-refractive-index film in which the refractive index gradually decreases from the phosphor layer 22 side toward the light-emitting surface 1*a* as shown in FIG. 12. In this case, the refractive index of the antireflection layer 160 on a side having a larger refractive index is desirably the same as that of a film that is in contact with the antireflection layer 160 (phosphor layer 22 in this case). It should be noted that in the case of a structure in which the phosphor layer 22 is interposed between two transparent substrates, for example, because one of the transparent substrates comes into contact with the antireflection layer, the refractive index of the antireflection layer on the transparent substrate side only needs to be made the same as that of the transparent substrate. On the other hand, the refractive index of the antireflection layer 160 on the light-emitting surface side is desirably as close to that of the air (i.e., 1.0) as possible.

The antireflection layer 160 having different refractive indices along the film thickness direction as described above can be deposited by, for example, a sputtering method using Si as a target. In this case, at an initial stage of the deposition, an Ar+$N_2$ gas is used as a sputtering gas to deposit a silicon nitride film. Then, an $N_2$ gas is substituted by an $O_2$ gas bit by bit during the deposition so as to reduce the refractive index of the film, and the Ar+$O_2$ gas is finally used to carry out the sputter deposition. Accordingly, a film having a refractive index inclined from about 2.0 to 1.46 can be obtained.

Figure 13:
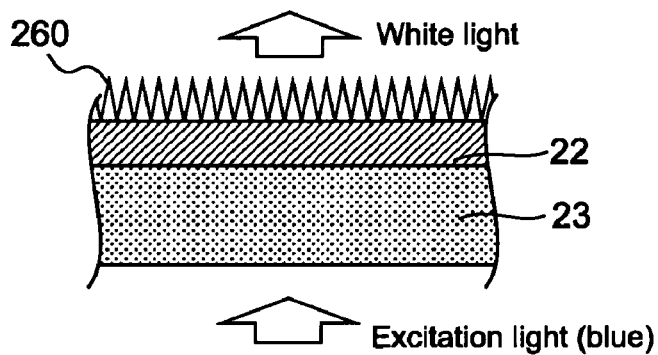
FIG. 13 is a partially-enlarged cross-sectional diagram showing another modification of the sheet-type color conversion device including the antireflection layer.
Figure 14:
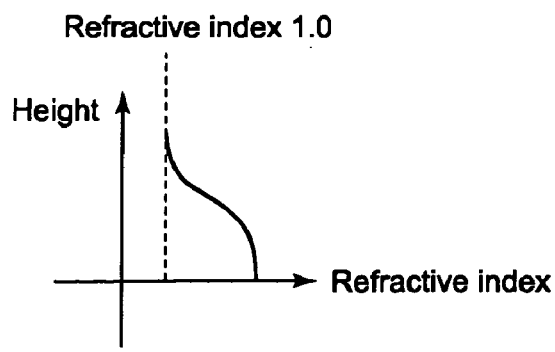
FIG. 14 is a diagram showing a relationship between a height and a refractive index of structural bodies of the sheet-type color conversion device shown in FIG. 13.

Moreover, as shown in FIG. 13, as another modification, there may also be provided an antireflection layer obtained by forming, on the light-emitting surface side, pyramids such as triangular pyramids and quadrangular pyramids or bombshell-like structural bodies 260 in an array. FIG. 13 is a partially-enlarged cross-sectional diagram schematically showing a sheet-type color conversion device. FIG. 14 is a diagram showing a relationship between a height of the structural bodies 260 and a refractive index thereof. It can be seen from FIG. 14 that the refractive index of the structural bodies 260 gradually decreases as a distance from the phosphor layer 22 increases. Also due to such structural bodies 260, the antireflection function can be obtained as in the case of the inclined-refractive-index film described above. In this modification, as each of the structural bodies 260, a quadrangular pyramid having a height of 0.7 μm and a side of a bottom surface thereof of 0.2 μm is formed, for example.

The pyramids or bombshell-like structural bodies 260 can be formed by, for example, a nanoimprint method that involves applying a thermoset or light-curing resin onto the first surface 22*a* of the phosphor layer 22, pressing a die in which desired structural bodies are inverted to thus transfer the configuration of the die onto the applied resin, and curing the resin using heat or ultraviolet rays.

Moreover, it is desirable for the antireflection layer to function as a protection film having a moisture barrier function. Accordingly, because degradation of the phosphors caused by the moisture entering from the outside is suppressed, a sheet-type color conversion device having a wider selection range of the phosphor materials and high reliability can be obtained. It should be noted that instead of aiming at antireflection, a protection film having the moisture barrier function may be formed so as to cover the phosphor layer. Accordingly, because degradation of the phosphors caused by the moisture entering from the outside is suppressed, a sheet-type color conversion device having a wider selection range of the phosphor materials and high reliability can be obtained. As the film material having such a moisture barrier function, aluminum oxide, silicon nitride, aluminum nitride, and the like can be used.

Fourth Embodiment

Figure 15:
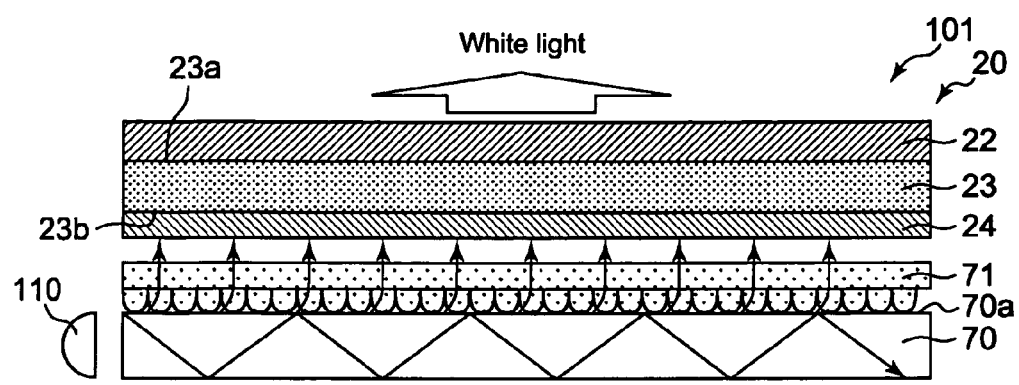
FIG. 15 is a schematic cross-sectional diagram of an illumination apparatus according to another embodiment of the present invention.

In the above embodiments, the blue-light-emitting diodes are disposed in correspondence with the entire surface of the illumination apparatus. However, as shown in FIG. 15, a light guide plate 70 may be provided, and a plurality of blue-light-emitting diodes 110 may be disposed at an end portion of the light guide plate 70 so that the number of blue-light-emitting diodes can be reduced. FIG. 15 is a schematic cross-sectional diagram of an illumination apparatus 101 of this embodiment. It should be noted that structures the same as those of the above embodiments are denoted by the same reference symbols, and descriptions thereof will be omitted.

As shown in FIG. 15, the illumination apparatus 101 includes the sheet-type color conversion device 20, a light-raising sheet 71, the light guide plate 70, and the blue-light-emitting diodes 110. The sheet-type color conversion device 20 includes the transparent substrate 23 having the first surface 23*a* and the second surface 23*b* opposing each other, the phosphor layer 22 disposed on the first surface 23*a* side, and the optical wavelength selection filter layer 24 disposed on the second surface 23*b* side. The plurality of blue-light-emitting diodes 110 are disposed along the end portion of the light guide plate 70. The light guide plate 70 is disposed on an optical path of light emitted from the blue-light-emitting diodes 110, between the blue-light-emitting diodes 110 and the transparent substrate 23. The light-raising sheet 71 is an optical sheet for raising the light from the light guide plate 70 in a vertical direction and has a function of uniformizing an in-plane luminance distribution of light emitted from the light guide plate to thus enhance front luminance.

As described above, the sheet-type color conversion device 20 can also be used in the illumination apparatus that uses the light guide plate 70 and has the blue-light-emitting diodes 110 disposed at the end portion of the light guide plate 70, whereby an illumination apparatus 101 with less loss of light and improved luminance can be obtained.

Figure 16:
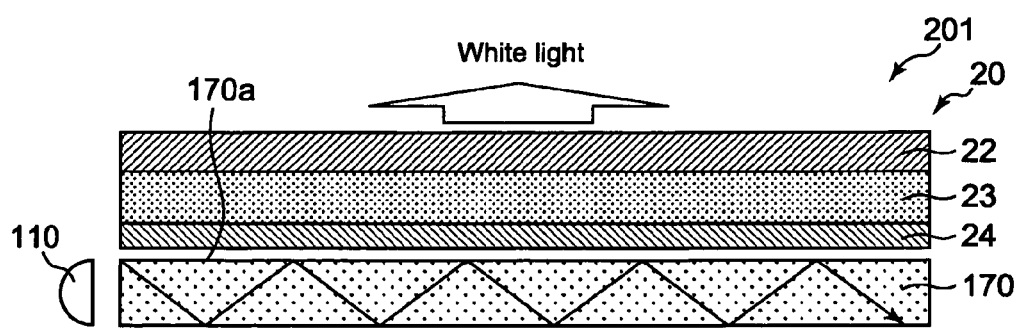
FIG. 16 is a schematic cross-sectional diagram showing a modification of the illumination apparatus shown in FIG. 15.

Although the light-raising sheet 71 is provided in this case, as in an illumination apparatus 201 shown in FIG. 16, a structure with a scattering light guide plate 170 and without the light-raising sheet 71 may be employed instead. The scattering light guide plate 170 is provided with a reflection plate (not shown) on a surface thereof opposed to a light-emitting surface 170*a* on which the sheet-type color conversion device 20 is disposed, and the reflection plate makes the in-plane luminance distribution of light emitted from the light-emitting surface uniform.

Fifth Embodiment

Figure 17:
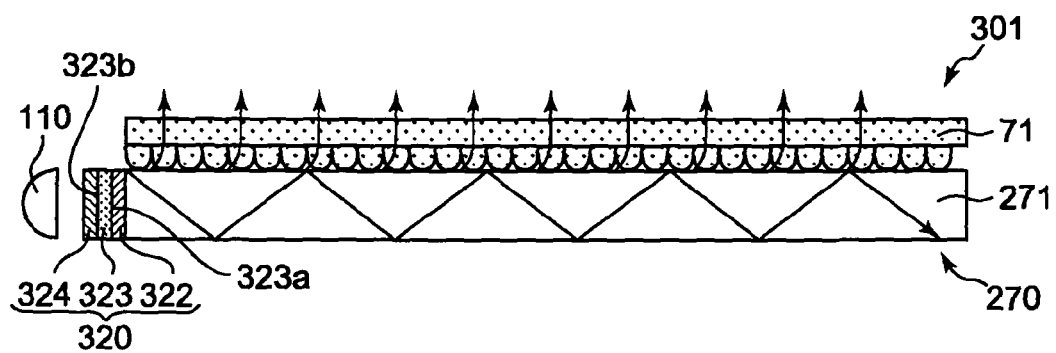
FIG. 17 is a schematic cross-sectional diagram of an illumination apparatus according to another embodiment of the present invention.

In the fourth embodiment, the sheet-type color conversion device 20 is disposed in the shape corresponding to the light-emitting surface of the illumination apparatus. However, as shown in FIG. 17, a sheet-type color conversion device 320 may be provided at an end portion of a light guide plate 271. FIG. 17 is a schematic cross-sectional diagram of an illumination apparatus 301 of this embodiment. Structures the same as those of the above embodiments are denoted by the same reference symbols, and descriptions thereof will be omitted.

As shown in FIG. 17, the illumination apparatus 301 includes a sheet-type-color-conversion-device-attached light guide plate 270 in which the sheet-type color conversion device 320 is disposed at an end portion of the light guide plate 271, the blue-light-emitting diodes 110 disposed in correspondence with the end portion of the sheet-type-color-conversion-device-attached light guide plate 270 at which the sheet-type color conversion device 320 is disposed, and the light-raising sheet 71 disposed on the light-emitting surface side of the sheet-type-color-conversion-device-attached light guide plate 270. The sheet-type color conversion device 320 is interposed between the blue-light-emitting diodes 110 and the light guide plate 271.

The sheet-type color conversion device 320 includes a transparent substrate 323 formed of PET (polyethylene terephthalate) or the like and has a first surface 323a and a second surface 323b, a phosphor layer 322 disposed on the first surface 323a of the transparent substrate 323, and an optical wavelength selection filter layer 324 disposed on the second surface 323b of the transparent substrate 323.

As the phosphor layer 322, one in which $SrGa_2S_4:Eu^{2+}$ as the green-color phosphor and (Ca, Sr, Ba) $S:Eu^{2+}$ as the red-color phosphor are dispersed within a binder constituted of a polyvinyl butyral resin, for example, is used as in the case of the phosphor layer 22 in the above embodiments.

Similar to the optical wavelength selection filter layer 24 in the above embodiments, the optical wavelength selection filter layer 324 is a layer that transmits therethrough blue light of the blue-color wavelength as the first wavelength emitted from the blue-light-emitting diodes 110, the blue light being excitation light, and reflects red light of the red-color wavelength as the second wavelength and green light of the green-color wavelength as the second wavelength the colors of which have been converted by the phosphor layer 322. The optical wavelength selection filter layer 324 is constituted of a lamination film obtained by laminating a first niobium pentoxide ($Nb_2O_5$) film, a first silicon dioxide ($SiO_2$) film, a second niobium pentoxide film, a second silicon dioxide film, and a third niobium pentoxide film in the stated order from the transparent substrate 323 side. The first niobium pentoxide film, the first silicon dioxide film, the second niobium pentoxide film, the second silicon dioxide film, and the third niobium pentoxide film have film thicknesses of 78 nm, 108 nm, 62 nm, 93 nm, and 80 nm, respectively. The niobium pentoxide films each have a refractive index n of 2.3, and the silicon dioxide films each have a refractive index n of 1.46. By thus laminating the films having different refractive indices, an optical wavelength selection filter layer 324 having a function of transmitting light of the first wavelength (blue light in this case) therethrough and reflecting light of the second wavelength (red and green light in this case) can be obtained.

The sheet-type color conversion device may thus be disposed at the end portion of the light guide plate. Accordingly, an illumination apparatus 301 with less loss of light and improved luminance can be obtained.

Figure 18:
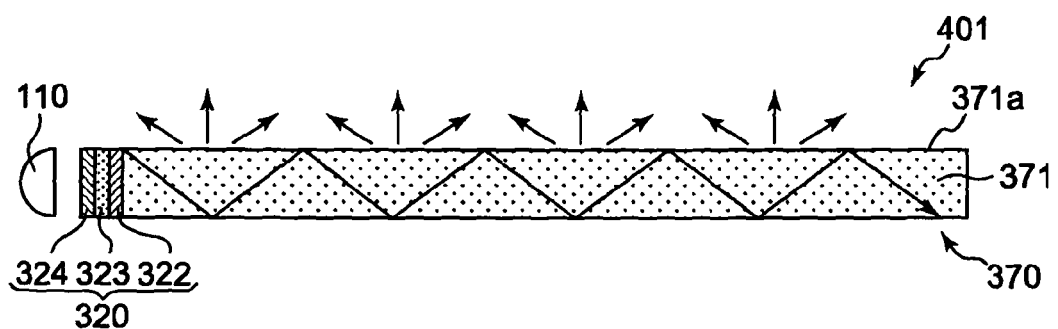
FIG. 18 is a schematic cross-sectional diagram showing a modification of the illumination apparatus shown in FIG. 17.

Although the light-raising sheet 71 is provided in this case, as shown in FIG. 18, a structure with a scattering light guide plate 371 and without the light-raising sheet 71 may be employed instead. In this case, an illumination apparatus 401 includes a sheet-type-color-conversion-device-attached light guide plate 370 in which the sheet-type color conversion device 320 is disposed at an end portion of the light guide plate 371, and the blue-light-emitting diodes 110 disposed in correspondence with the end portion of the sheet-type-color-conversion-device-attached light guide plate 370 at which the sheet-type color conversion device 320 is disposed. The scattering light guide plate 371 is provided with a reflection plate (not shown) on a surface thereof opposed to a light-emitting surface 371a, and the reflection plate scatters the light emitted from the light-emitting surface to thus make the in-plane luminance distribution uniform.

It should be understood by those skilled in the art that various modifications, combinations, sub-combinations and alterations may occur depending on design requirements and other factors insofar as they are within the scope of the appended claims or the equivalents thereof.

What is claimed is:

1. An illumination apparatus, comprising:
   a transparent substrate including oppositely facing first and second surfaces;
   a phosphor layer disposed on a first surface side of the transparent substrate;
   an optical wavelength selection filter layer disposed on a second surface side of the transparent substrate and configured to transmit light of a first wavelength therethrough and reflect light of a second wavelength that is emitted from the phosphor layer by being excited by the light of the first wavelength; and
   a light-emitting device configured to emit the light of the first wavelength toward the optical wavelength selection filter layer,
   wherein,
      the optical wavelength selection filter layer is between the transparent substrate and the light-emitting device,
      the optical wavelength selection filter layer includes at least a first film and a second film, and
      the first film is in contact with the second surface of the transparent substrate, the first film having a greater refractive index than the second film.

2. The illumination apparatus according to claim 1, wherein the light-emitting device is a blue-light-emitting diode, and
   wherein the phosphor layer includes a phosphor that emits green light by being excited by excitation light that is blue light and a phosphor that emits red light by being excited by the excitation light.

3. The illumination apparatus according to claim 1, wherein the light-emitting device is a blue-light-emitting diode, and
   wherein the phosphor layer includes a phosphor that emits yellow light by being excited by excitation light that is blue light.

4. The illumination apparatus according to claim 1, wherein the light-emitting device is a purple-light-emitting diode, and
   wherein the phosphor layer includes a phosphor that emits red light by being excited by excitation light that is purple light, a phosphor that emits green light by being excited by the excitation light, and a phosphor that emits blue light by being excited by the excitation light.

5. The illumination apparatus according to claim 1, wherein the optical wavelength selection filter layer is obtained by laminating at least the first film and the second film, the first film being an $Nb_2O_5$ film and the second film being an $SiO_2$ film.

6. The illumination apparatus according to claim 1, wherein a plurality of light-emitting devices are provided in correspondence with an entire surface of the transparent substrate.

7. The illumination apparatus according to claim 1, further comprising a light guide plate disposed on an optical path of the light emitted from the light-emitting device, between the light-emitting device and the optical wavelength selection filter layer.

8. The illumination apparatus according to claim 7, wherein a plurality of light-emitting devices are provided along an end portion of the light guide plate.

9. The illumination apparatus according to claim 1, further comprising a protection film that has a moisture barrier function, the protection film disposed on a surface of the phosphor layer opposed to a surface thereof on the first surface side of the transparent substrate.

10. The illumination apparatus according to claim 1, further comprising an antireflection layer disposed on a surface of the phosphor layer opposed to a surface thereof on the first surface side of the transparent substrate.

11. An illumination apparatus, comprising:
a light guide plate;
a plurality of light-emitting devices disposed along an end portion of the light guide plate and each configured to emit light of a first wavelength;
a phosphor layer;
a transparent substrate; and
an optical wavelength selection filter layer configured to transmit the light of the first wavelength therethrough and reflect light of a second wavelength that is emitted from the phosphor layer by being excited by the light of the first wavelength,
wherein,
the phosphor layer, the transparent substrate, and the optical wavelength selection filter layer are disposed between the light guide plate and the plurality of light-emitting devices in the stated order from the light guide plate side,
the optical wavelength selection filter layer includes at least a first film and a second film, and
the first film is in contact with the second surface of the transparent substrate, the first film having a greater refractive index than the second film.

12. A color conversion device, comprising:
a transparent substrate including oppositely facing first and second surfaces;
a phosphor layer disposed on a first surface side of the transparent substrate;
a light-emitting device; and
an optical wavelength selection filter layer disposed on a second surface side of the transparent substrate and configured to transmit light of a first wavelength therethrough and reflect light of a second wavelength,
wherein,
the optical wavelength selection filter layer is between the transparent substrate and the light-emitting device,
the optical wavelength selection filter layer includes at least a first film and a second film, and
the first film is in contact with the second surface of the transparent substrate, the first film having a greater refractive index than the second film.

13. A display apparatus, comprising:
a display panel; and
an illumination apparatus provided adjacent to the display panel, the illumination apparatus including
a transparent substrate including oppositely facing first and second surfaces,
a phosphor layer disposed on a first surface side of the transparent substrate,
an optical wavelength selection filter layer disposed on a second surface side of the transparent substrate and configured to transmit light of a first wavelength therethrough and reflect light of a second wavelength that is emitted from the phosphor layer by being excited by the light of the first wavelength, and
a light-emitting device configured to emit the light of the first wavelength toward the optical wavelength selection filter layer,
wherein,
the optical wavelength selection filter layer is between the transparent substrate and the light-emitting device,
the optical wavelength selection filter layer includes at least a first film and a second film, and
the first film is in contact with the second surface of the transparent substrate, the first film having a greater refractive index than the second film.

* * * * *